US006965841B2

(12) United States Patent
Tanifuji

(10) Patent No.: US 6,965,841 B2
(45) Date of Patent: Nov. 15, 2005

(54) PACE MEASURING DEVICE

(75) Inventor: Norio Tanifuji, Chiba (JP)

(73) Assignee: Seiko Instruments Inc., Chiba (JP)

( * ) Notice: Subject to any disclaimer, the term of this patent is extended or adjusted under 35 U.S.C. 154(b) by 39 days.

(21) Appl. No.: 10/372,584

(22) Filed: Feb. 24, 2003

(65) Prior Publication Data

US 2003/0216885 A1 Nov. 20, 2003

(30) Foreign Application Priority Data

Feb. 25, 2002 (JP) ....................................... 2002-047461
Feb. 21, 2003 (JP) ....................................... 2003-044699

(51) Int. Cl.[7] .................................................. G01P 7/00
(52) U.S. Cl. ....................................... 702/149; 702/142
(58) Field of Search ................................ 702/141, 142, 702/149, 160, 176; 368/10, 204, 208, 209; 73/490

(56) References Cited

U.S. PATENT DOCUMENTS 4,640,624 A 2/1987 Pitt ............................ 368/111
4,962,469 A 10/1990 Ono et al. .................. 364/561
5,490,816 A * 2/1996 Sakumoto ...................... 482/3
5,908,396 A * 6/1999 Hayakawa et al. ......... 600/587

FOREIGN PATENT DOCUMENTS

| | | |
|---|---|---|
| EP | 0060361 | 9/1982 |
| EP | 0638336 | 2/1995 |
| EP | 0741278 | 11/1996 |
| FR | 2681167 | 3/1993 |
| WO | 01042809 | 6/2001 |

OTHER PUBLICATIONS

Patent Abstracts of Japan, vol. 0175, No. 63 (P–1628), Oct. 12 1993, publication No. 05164571, publication date Jun. 29, 1993.

* cited by examiner

*Primary Examiner*—Bryan Bui
(74) *Attorney, Agent, or Firm*—Adams & Wilks

(57) ABSTRACT

To let the user easily recognize the results of comparison of paces. A chronograph control unit calculates a pace of running that is just completed by dividing the moving time measured by a chronograph measuring unit, by a preset distance stored in advance in a storage unit. A pace comparator/calculation unit reads the pace data recorded in the running of the previous time from the storage unit, compares it with the pace recorded this time to calculate a difference therebetween, displays the difference on a display unit, and notifies a relationship between the pace recorded this time and the pace recorded in the previous time by using a sounding unit or a light-emitting unit.

13 Claims, 13 Drawing Sheets

PACE MEASURING DEVICE

BACKGROUND OF THE INVENTION

This invention relates to a pace measuring device for measuring a moving time (pace) per a unit distance.

In the marathon and like races, there has heretofore been used a pace measuring device for measuring the moving time (pace) per a unit distance.

For example, there has been used a pace measuring device according to which the time measured by the user of the pace measuring device is divided by a distance of running that has been set in advance thereby to calculate and display the time per a unit distance (e.g., one kilometer or one mile).

The user may participate in the marathon race while mounting the pace measuring device on his body to measure and learn his own pace.

By using the above conventional pace measuring device, however, it is possible to record the pace but there is no means for comparing the newly measured pace with the pace that has been measured. Therefore, the user himself must compare the pace of this time with the pace of the previous time, requiring a very cumbersome operation.

In measuring the pace while running, further, the pace of the previous time cannot be viewed and cannot be compared with the pace data being measured unless the switch provided in the pace measuring device is manipulated.

In comparing the pace data, further, the data are simply displayed, from which, however, the user is unable to recognize at a glance whether the pace is fast or slow.

SUMMARY OF THE INVENTION

This invention is intended to make it easy to recognize the result of comparison of pace data.

The invention further makes it easy to recognize the result of comparison of pace data while taking a measurement during the moving.

According to this invention, there is provided a pace measuring device comprising pace measuring means for measuring the pace which is a moving time per a unit distance, storage means for storing pace data that are to be compared, comparator means for comparing the pace stored in the storage means with the latest pace measured by the pace measuring means, and notifying means for notifying the result of comparison by the comparator means. The pace measuring means measures the pace which is a moving time per a unit time. The comparator means compares the pace stored in the storage means with the latest pace measured by the pace measuring means. The notifying means notifies the results of comparison by the comparator means.

Here, the latest pace measured by the pace measuring means may be the one after the measuring has been completed.

The latest pace measured by the pace measuring means may be the one obtained during the measuring.

The pace data stored in the storage means may be the past pace data after the measuring has been completed.

The pace data stored in the storage means may be the pace data that are being measured by the pace measuring means.

The storage means may store a plurality of pace data and may include selection means for selecting predetermined pace data out of the plurality of pace data, and the comparator means may compare the pace data selected by the selection means with the latest pace.

The selection means may select the pace data recorded in the previous time out of the plurality of pace data stored in the storage means, and the comparator means may compare the pace selected by the selection means with the latest pace.

The selection means may select the shortest pace data out of the plurality of pace data stored in the storage means, and the comparator means may compare the pace selected by the selection means with the latest pace.

The selection means may calculate an average value of a plurality of pace data stored in the storage means, and the comparator means may compare the average value calculated by the selection means with the latest pace.

The pace measuring means may possess moving distance measuring means for measuring the moving distance of the user.

The storage means may store a plurality of pace data and the moving distance data corresponding thereto at the time of calculating the pace data, the selection means may select pace data over a predetermined moving distance out of the plurality of pace data stored in the storage means, and the comparator means may compare the pace data selected by the selection means with the latest pace.

The selection means may select the pace data over a moving distance approximate to the moving distance of the latest pace measured by the moving distance measuring means among the plurality of pace data stored in the storage means, and the comparator means may compare the pace data selected by the selection means with the latest pace.

The selection means may select the pace data over a moving distance most approximate to the moving distance of the latest pace but is longer than the moving distance of the latest pace out of the plurality of pace data stored in the storage means, and the comparator means may compare the pace data selected by the selection means with the latest pace.

The selection means may select the pace data over a moving distance most approximate to the moving distance of the latest pace but is shorter than the moving distance of the latest pace out of the plurality of pace data stored in the storage means, and the comparator means may compare the pace data selected by the selection means with the latest pace.

The comparator means may include distance reach judging means for judging whether the moving distance measured by the moving distance measuring means has reached a reference distance stored in advance in the storage means, and compares the latest pace with the pace of the previous time stored in the storage means when the distance reach judging means has judged that the moving distance is in agreement with the reference distance; and the notifying means notifies the results of comparison by the comparator means.

The comparator means may include distance reach judging means for judging whether the moving distance measured by the moving distance measuring means has reached a reference distance stored in advance in the storage means, and compares the latest pace with the shortest pace stored in the storage means when the distance reach judging means has judged that the moving distance is in agreement with the reference distance; and the notifying means notifies the results of comparison by the comparator means.

The notifying means may include sound notifying means for notifying that the latest pace is faster or slower than the pace for comparison based on the result of comparison by the comparator means.

The notifying means may include light-emitting notifying means for notifying that the latest pace is faster or slower than the pace for comparison based on the result of comparison by the comparator means.

Further, provision is made of first time measuring means for measuring the moving time and for measuring the moving time from the initial state in response to a reset signal; wherein upon detecting that the time measured by the time measuring means is in agreement with the pace measured in the previous time and stored in the storage means, the comparator means produces a coincidence signal as well as the reset signal; and notifying means includes sound notifying means for notifying, by at least sound, or light-emitting notifying means for notifying, by at least emitting light, that the time is in agreement with the pace stored in the previous time in response to the coincidence signal.

Provision is made of first time measuring means for measuring the moving time and for measuring the moving time from the initial state in response to a reset signal; wherein upon detecting that the time measured by the time measuring means is in agreement with the shortest pace stored in the storage means, the comparator means produces a coincidence signal as well as the reset signal; and notifying means includes sound notifying means for notifying, by at least sound, or light-emitting notifying means for notifying, by at least emitting light, that the time is in agreement with the shortest pace in response to the coincidence signal.

The pace measuring means includes acceleration measuring means for measuring the acceleration at which the user is moving and second time measuring means for measuring the moving time, wherein the moving distance is calculated based upon the acceleration measured by the acceleration measuring means, and the pace is calculated by dividing, by the moving distance, the time measured by the time measuring means.

Further, provision may be made of an electronic wrist watch function.

BRIEF DESCRIPTION OF THE DRAWINGS

A preferred embodiment of the invention will now be described with reference to the accompanying drawings wherein.

DETAILED DESCRIPTION OF THE PREFERRED EMBODIMENTS

Figure 1:
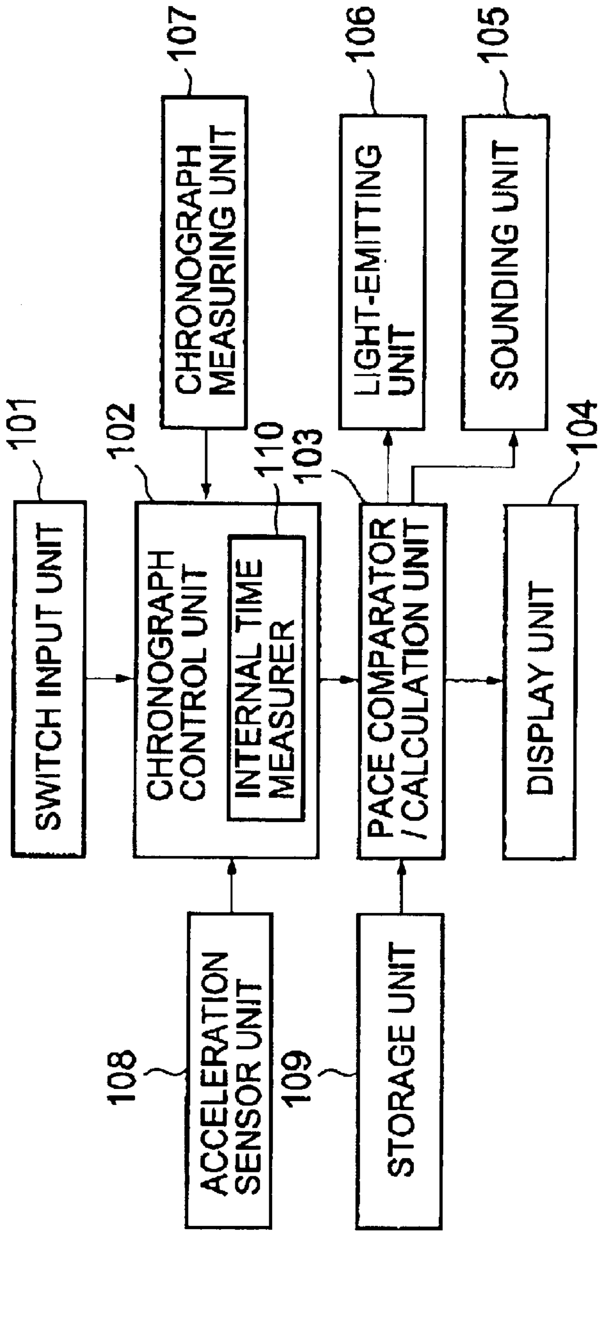
FIG. 1 is a block diagram of a pace measuring device according to an embodiment of the invention.

FIG. 1 is a functional block diagram of a pace measuring device according to an embodiment of the invention, and illustrates a body-mounted pace measuring device which is used by being mounted on the body of a user. The pace measuring device according to this embodiment is obtained by furnishing the function of an electronic wrist watch with a processing function that will be described later, and is constituted as the electronic wrist watch furnished with the processing function that will be described later.

In FIG. 1, the pace measuring device includes a switch input unit 101, a chronograph control unit 102, a pace comparator/calculation unit 103, a display unit 104, a sounding (or sound emitting) unit 105, a light-emitting unit 106, a chronograph measuring unit 107, an acceleration sensor unit 108 and a storage unit 109. The chronograph control unit 102 includes an internal time measurer 110 as first time measuring means.

By using the input switch unit 101 which serves as an operation means, there may be conducted an operation for starting the measurement of a user's pace, an operation for ending the pace measurement, an operation for inputting a unit distance (reference distance) used for calculating the pace, an operation for inputting the moving distance, and an operation for selecting the pace data for comparison and collation. The data such as reference distance input by using the input switch unit 101 are stored in the storage unit 109.

The chronograph measuring unit 107 which serves as second time measuring means works to measure the moving time of the user.

The acceleration sensor unit 108 which serves as acceleration detecting means measures the acceleration of the user who is running while wearing the pace measuring device.

The chronograph control unit 102 controls the whole pace measuring device, calculates the running distance based on the acceleration data from the acceleration sensor unit 108 and, further, executes the processing that will be described later.

The pace comparator/calculation means 103 which serves as comparator means works to compare and calculate the pace.

The display unit 104 displays the result of processing executed by the pace comparator/calculation unit 103. The sounding unit 105 which serves as sound notifying means and the light-emitting unit 106 which serves as light-emitting notifying means, work to notify the result of processing executed by the pace comparator/calculation means 103 in the form of sound and light. The display unit 104, sounding unit 105 and light-emitting unit 106 constitute notifying means.

In the storage unit 109 that serves as storage means, there has been stored a program for executing a processing that will be described later by a central processing unit (CPU) that is not shown. The functions of the chronograph control unit 102 and pace comparator/calculation unit 103 are realized by the program processing executed by the CPU. By operating the switch input unit 101, further, a reference distance used for calculating the pace is set in advance to the storage unit 109. In the storage unit 109 are further stored the data measured in the past, such as pace data after the measuring has been completed, moving distance data of when the pace was measured, and measuring time at the time of measuring the pace. In the storage unit 109 are further stored, at any time, the pace data now being measured, distance data and measuring time data.

The chronograph control unit 102, chronograph measuring unit 107 and acceleration sensor unit 108 are constituting pace measuring means and moving distance measuring means. Further, the chronograph control unit 102 constitutes selection means together with the switch input unit 101. Further, the pace comparator/calculation unit 103 constitutes distance reach judging means.

Figure 2:
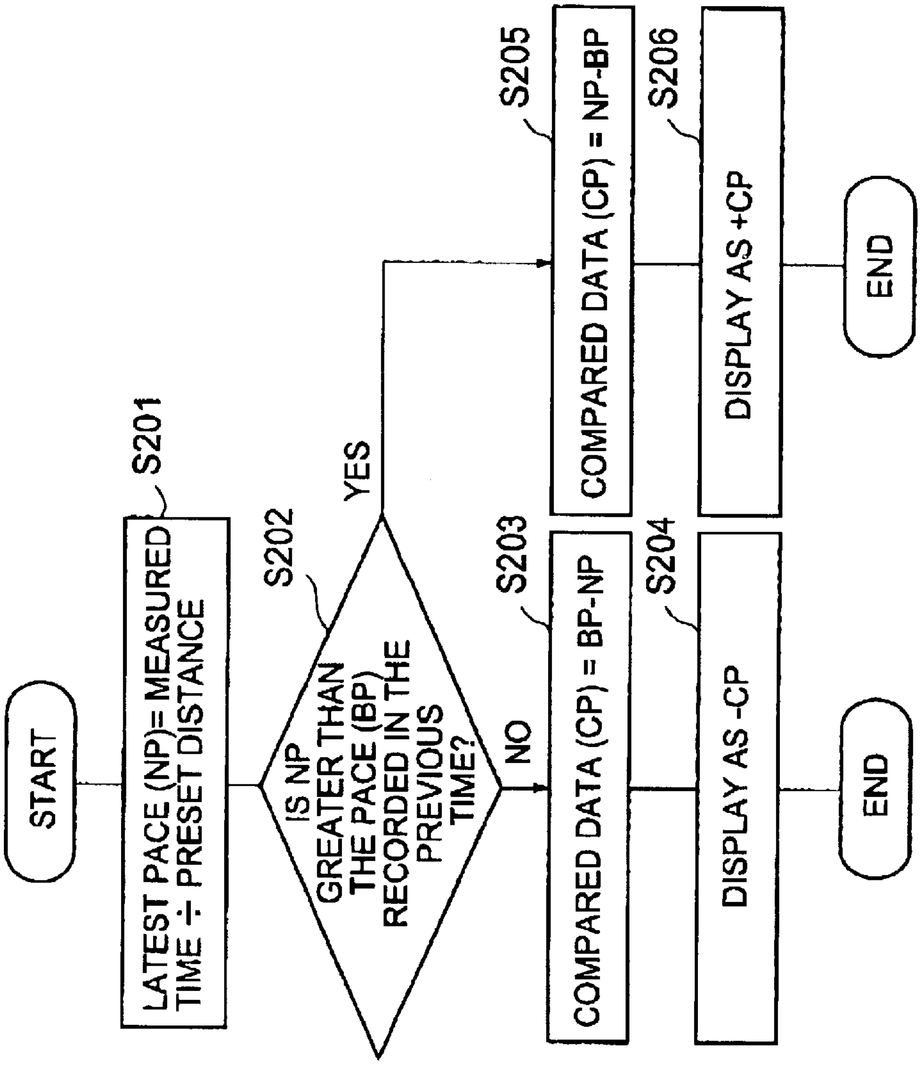
FIG. 2 is a flowchart illustrating the processing by the pace measuring device according to the embodiment of the invention.

FIG. 2 is a flowchart illustrating the processing by the pace measuring device according to the embodiment of the invention, i.e., the processing for comparing the paces. Described below is the processing for comparing the paces.

A person mounting (such as holding or wearing) the pace measuring device on their body and taking part in a marathon or other race operates the switch input unit 101 as he starts moving (running) to start a measuring operation. The chronograph measuring unit 107 starts measuring the moving time in response to the start operation.

The user operates the switch input unit 101 simultaneously with the completion of the movement over a predetermined distance, so that the chronograph measuring unit 107 ends the measuring of the moving time in response to the ending operation. At the same time, the chronograph control unit 102 divides the moving time measured by the chronograph measuring unit 107 by the running distance (preset distance) that has been stored in advance in the storage unit 109 in response to the ending operation thereby to calculate the pace (latest pace (NP)) that is run this time (step 5201).

The pace comparator/calculation unit 103 reads, from the storage unit 109, the pace (BP) data recorded in the running of the previous time and stored in the storage unit 109, and compares with it the latest pace (NP) recorded this time (step S202).

When the latest pace (NP) is greater than the pace (BP) recorded in the previous time (when the pace of this time is slower), a difference (NP−BP) between NP and BP is calculated as a pace difference CP (step S205). The calculated pace difference CP is attached with a plus sign and is displayed as "+CP" on the display unit 104 (step S206).

At step S202, on the other hand, when the latest pace (NP) is not greater than the pace (BP) recorded in the previous time (when the pace of this time is faster or is the same), a difference (BP−NP) between BP and NP is calculated as a pace difference CP (step S203). The calculated pace difference CP is attached with a minus sign and is displayed as "−CP" on the display unit 104 (step S204).

Therefore, the user is allowed to easily recognize the result of comparison between the latest pace and the pace of the previous time. At step S201, further, the data of the latest pace that is calculated and the measured time may be corresponded to each other and may be stored in the storage unit 109.

Figure 3:
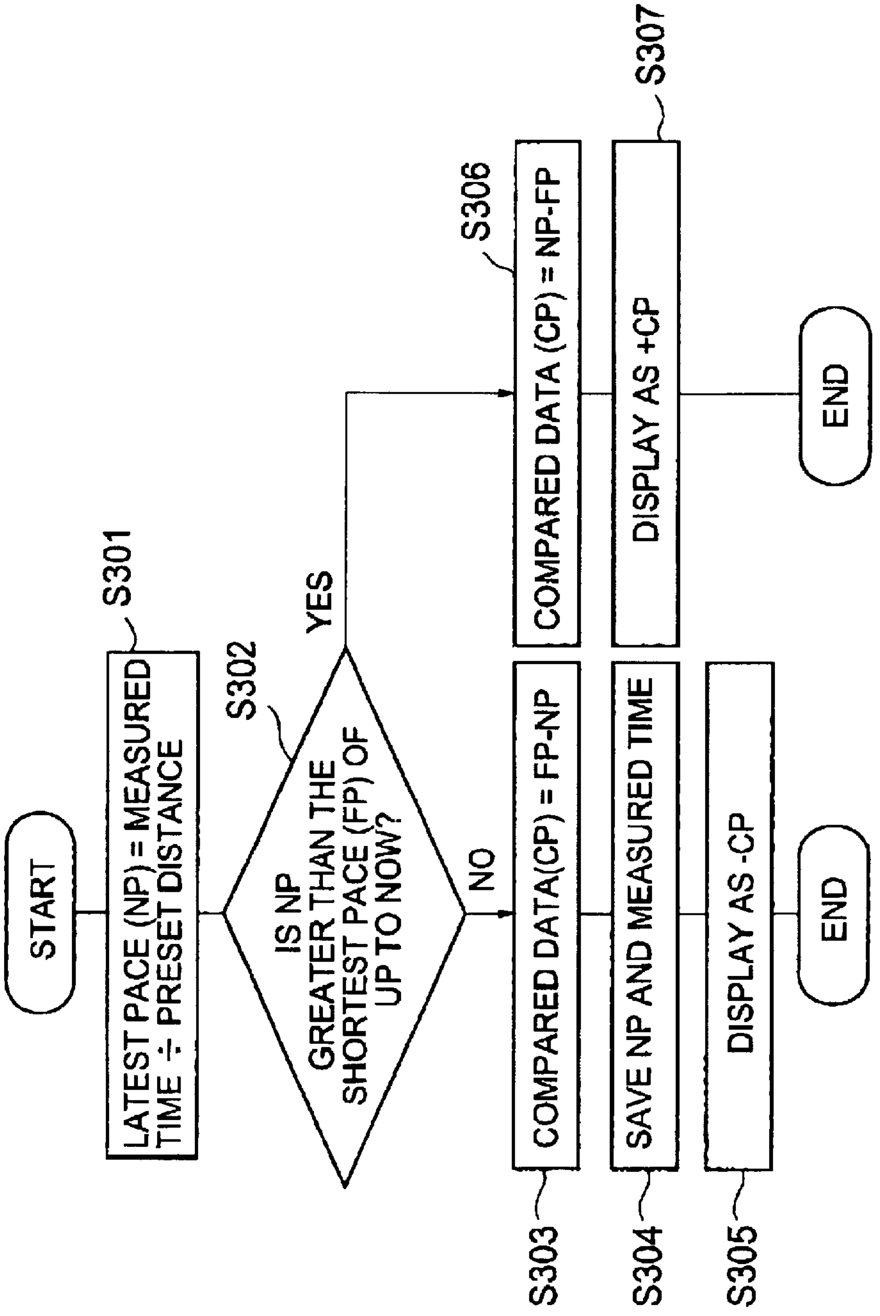
FIG. 3 is a flowchart illustrating the processing by the pace measuring device according to the embodiment of the invention.

FIG. 3 is a flowchart illustrating the processing by the pace measuring device according to the embodiment of the invention, i.e., the processing for comparing the latest pace with the shortest pace among the paces recorded in the past. Described below is the processing for comparison with the shortest pace.

A person mounting the pace measuring device operates the switch input unit 101 as he starts running to start measuring. The chronograph measuring unit 107 starts measuring the moving time in response to the start operation. The user operates the switch input unit 101 simultaneously with the completion of the running over a predetermined distance, so that the chronograph measuring unit 107 ends the measuring of the moving time in response to the ending operation. At the same time, the chronograph control unit 102 divides the time measured by the chronograph measuring unit 107 by the running distance (preset distance) that has been stored in advance in the storage unit 109 thereby to calculate the pace (latest pace (NP)) that is run this time (step S301). The measured time and the calculated pace are stored in the storage unit 109 being corresponded to the preset distance.

The pace comparator/calculation unit 103 reads, from the storage unit 109, the shortest pace (FP) data among the paces recorded in the past running, and compares with it the latest pace (NP) recorded this time (step S302). When the latest pace (NP) is greater than the shortest pace (FP) (when the pace of this time is slower), a difference (NP−FP) between NP and FP is calculated as a pace difference CP (step S306). The calculated pace difference CP is attached with a plus sign and is displayed as "+CP" on the display unit 104 (step S307).

At step S302, on the other hand, when the latest pace (NP) is not greater than the shortest pace (FP) (when the pace of this time is faster or is the same), a difference (FP−NP) between FP and NP is calculated as a pace difference CP (step S303). The data of the latest pace (NP) and the measured time are corresponded to each other and are stored in the storage unit 109 (step S304). The pace comparator/calculation unit 103 attaches a minus sign to the calculated pace difference CP to display it as "−CP" on the display unit 104 (step S305).

Therefore, the user is allowed to easily recognize the result of comparison between the latest pace and the shortest pace in the past. At step S301, further, the data of the latest pace that is calculated and the measured time may be corresponded to each other and may be stored in the storage unit 109.

Figure 4:
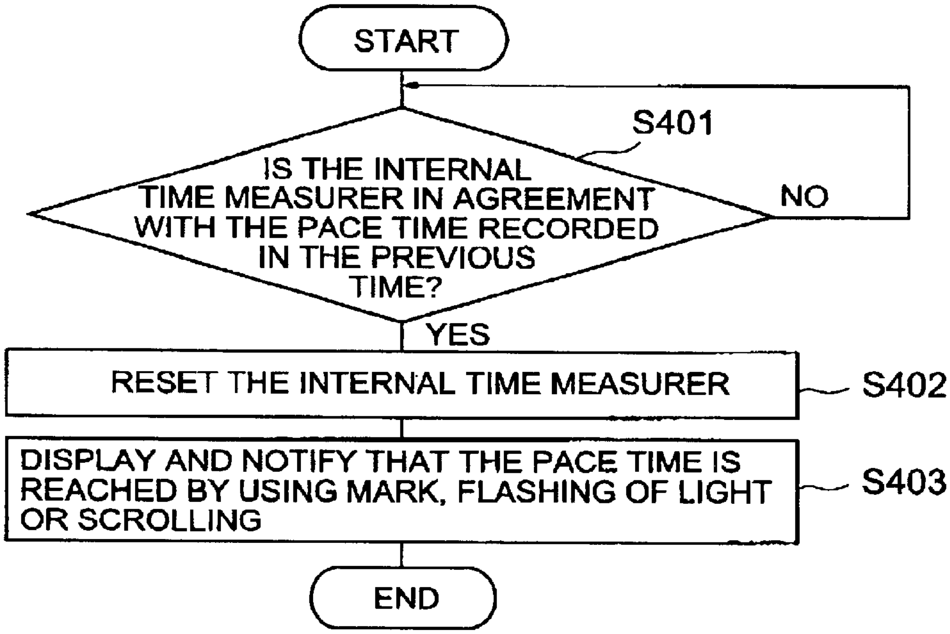
FIG. 4 is a flowchart illustrating the processing by the pace measuring device according to the embodiment of the invention.

FIG. 4 is a flowchart illustrating the processing by the pace measuring device according to the embodiment of the invention, i.e., the processing for displaying that the pace now being measured has become a predetermined time. Described below is the processing for displaying the pace.

A person mounting the pace measuring device operates the switch input unit 101 as he starts running to start measuring. The chronograph measuring unit 107 starts measuring the time in response to the start operation.

At the same time, the internal time measurer 110 provided in the chronograph control unit 102 starts measuring the moving time.

The pace comparator/calculation unit 103 compares the time measured by the internal time measurer 110 with the pace recorded in the previous time in the storage unit 109 (step S401).

When it is detected at step S401 that the time measured by the internal time measurer 110 has become equal to the pace recorded in the previous time, the pace comparator/calculation unit 103 sends a reset signal to the internal time measurer 110 to reset it (step S402), and notifies on the display unit 104 that the pace has become equal to that of the previous time (step S403). The mode of display on the display unit 104, in this case, may be the one using marks, the one based on the flashing of light or the one based on the scrolling. The user is, then, allowed to easily recognize that the pace has now become equal to the pace recorded in the previous time. After being reset, the internal time measurer 110 starts again the timekeeping operation from zero to repeat the above operation.

Then, the user after having moved the predetermined distance operates the switch input unit 101, so that the chronograph measurer unit 107 ends the measuring of moving time. Accordingly, the processing shown in FIG. 2 or 3 is executed, and a difference between the past pace and the pace of this time can be confirmed.

Figure 5:
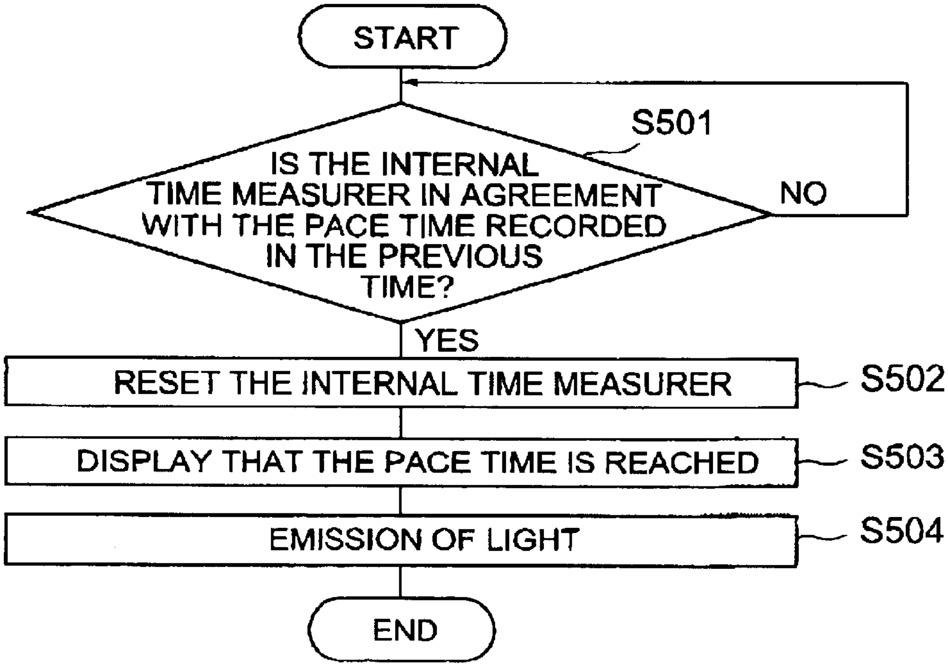
FIG. 5 is a flowchart illustrating the processing by the pace measuring device according to the embodiment of the invention.

FIG. 5 is a flowchart illustrating the processing by the pace measuring device according to the embodiment of the invention, i.e., the processing for notifying that the pace now being measured has become a predetermined time. Described below is the processing for notifying the pace by the emission of light.

A person mounting the pace measuring device operates the switch input unit 101 as he starts marathon running to start measuring. The chronograph measuring unit 107 starts measuring the time in response to the start operation.

At the same time, the internal time measurer 110 provided in the chronograph control unit 102 starts measuring the time.

The pace comparator/calculation unit 103 compares the time measured by the internal time measurer 110 with the pace recorded in the previous time in the storage unit 109 (step S501).

When it is detected by the pace comparator/calculation unit 103 that the time measured by the internal time measurer 110 has become equal to the pace recorded in the previous time, the chronograph control unit 102 sends a reset signal to the internal time measurer 110 to reset it (step S502), and notifies on the display unit 104 that the pace has become equal to that of the previous time (step S503). Further, the light-emitting unit 106 is energized to notify it by emitting light (step S504). Upon recognizing light emitted by the light-emitting unit 106, the user is allowed to easily recognize that the pace has now become equal to the pace recorded in the previous time. After being reset, the internal time measurer 110 starts again the timekeeping operation from zero.

Then, the user after having run the predetermined distance operates the switch input unit 101, so that the chronograph measurer unit 107 ends the measuring of the time in response to the ending operation. Accordingly, the processing shown in FIG. 2 or 3 is executed, and a difference between the past pace and the pace of this time can be confirmed.

Figure 6:
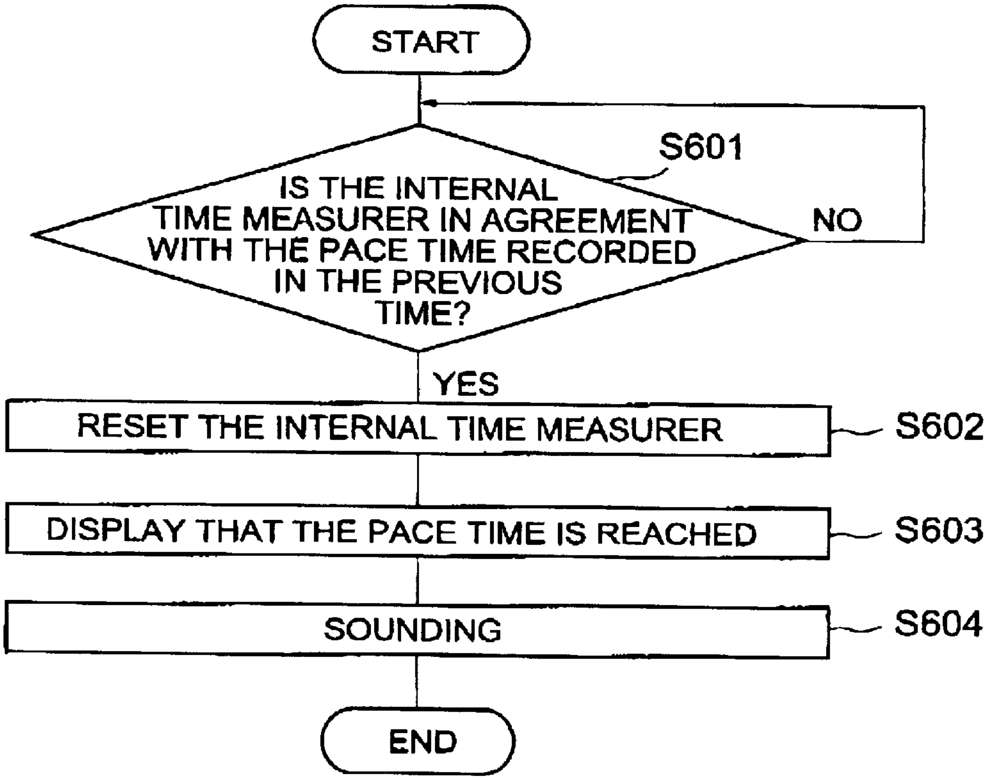
FIG. 6 is a flowchart illustrating the processing by the pace measuring device according to the embodiment of the invention.

FIG. 6 is a flowchart illustrating the processing by the pace measuring device according to the embodiment of the invention, i.e., the processing for notifying (sounding) that the pace now being measured has become a predetermined time. Described below is the processing for notifying the pace by the sounding.

A person mounting the pace measuring device operates the switch input unit 101 as he starts marathon running to start measuring. The chronograph measuring unit 107 starts measuring the time in response to the start operation.

At the same time, the internal time measurer 110 provided in the chronograph control unit 102 starts measuring the time.

The pace comparator/calculation unit 103 compares the time measured by the internal time measurer 110 with the pace recorded in the previous time in the storage unit 109 (step S601).

When it is detected by the pace comparator/calculation unit 103 that the time measured by the internal time measurer 110 has become equal to the pace recorded in the previous time, the chronograph control unit 102 sends a reset signal to the internal time measurer 110 to reset it (step S602), and notifies on the display unit 104 that the pace has become equal to that of the previous time (step S603). Further, the sounding unit 105 is energized to notify it by sound (step S604). Upon recognizing the sound produced by the sounding unit 105, the user is allowed to easily recognize that the pace has now become equal to the pace recorded in the previous time. After being reset, the internal time measurer 110 starts again the timekeeping operation from zero.

Then, the user after having run the predetermined distance operates the switch input unit 101, so that the chronograph measurer unit 107 ends the measuring of the time. Accordingly, the processing shown in FIG. 2 or 3 is executed, and a difference between the past pace and the pace of this time can be confirmed.

Figure 7:
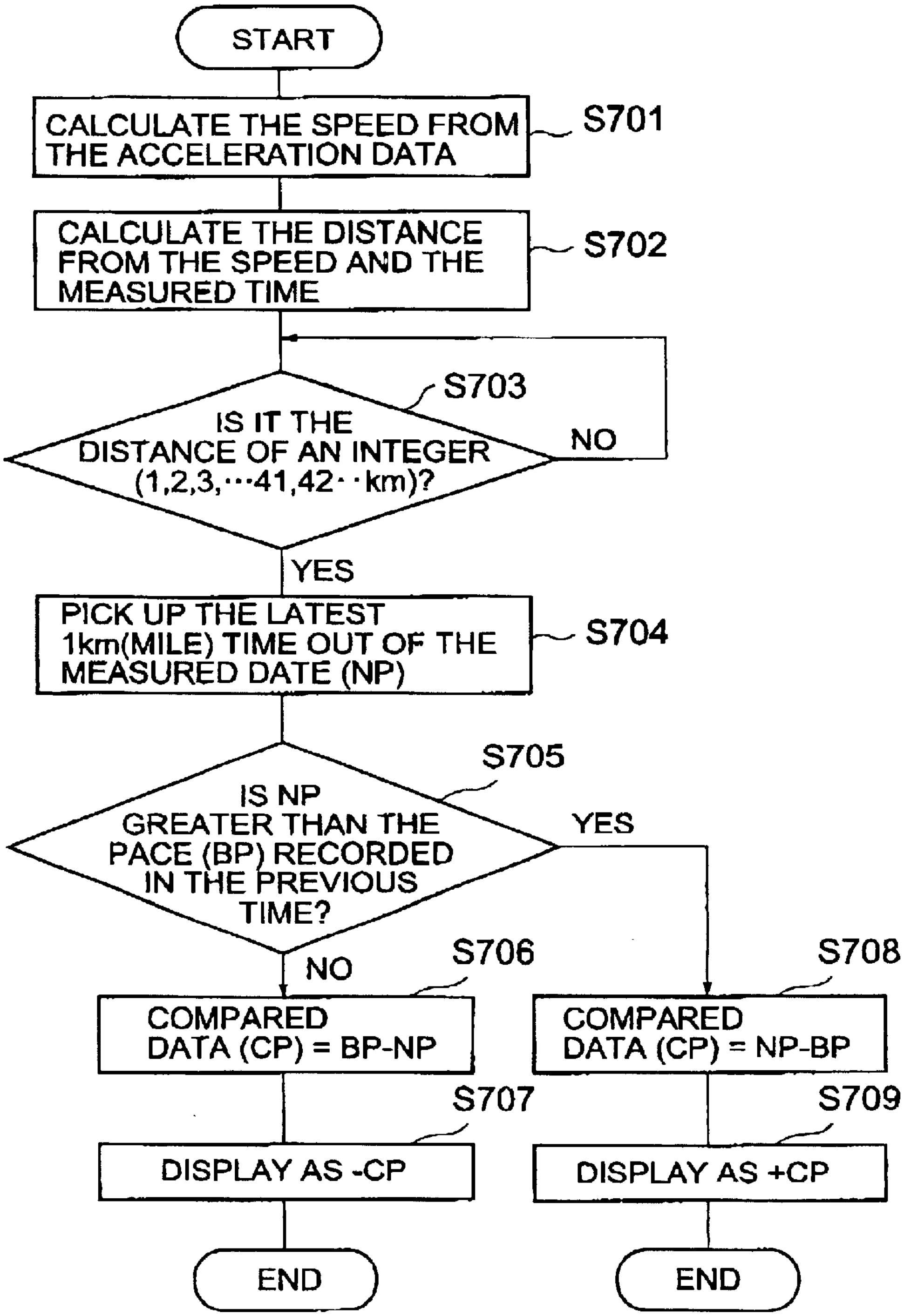
FIG. 7 is a flowchart illustrating the processing by the pace measuring device according to the embodiment of the invention.

FIG. 7 is a flowchart illustrating the processing by the pace measuring device according to the embodiment of the invention, i.e., the processing for comparing the latest pace now being measured with the pace recorded in the previous time. Described below is the processing for comparing the latest pace with the recorded pace.

A person mounting the pace measuring device operates the switch input unit 101 as he starts marathon running to start measuring. The chronograph measuring unit 107 starts measuring the time in response to the start operation.

The acceleration sensor 108 detects the acceleration as the person mounting the pace measuring device moves, and outputs it to the chronograph control unit 102.

The chronograph control unit 102 calculates the moving speed of the user based on the acceleration data from the acceleration sensor 108 (step S701).

Next, the chronograph control unit 102 calculates the moving distance from the start position of the user based on the time measured by the chronograph measuring unit 107 and on the moving speed data (step S702).

Then, the chronograph control unit 102 judges whether the calculated moving distance is a predetermined distance (distance of an integer in this embodiment)(step S703). The predetermined distance has been stored in advance in the storage unit 109 by the operation of the switch input unit 101.

When it is judged that the calculated moving distance has become equal to the predetermined distance (distance of an integer in this embodiment), the chronograph control unit 102 picks up, from the storage unit 109, the latest moving time (latest pace (NP)) over the reference distance (e.g., one kilometer or one mile) out of the measured data (step S704).

The pace comparator/calculation unit 103 reads the pace (BP) recorded in the running of the previous time from the storage unit 109, and compares it with the latest pace (NP) recorded this time (step S705).

When the latest pace (NP) is greater than the pace (BP) recorded in the previous time (when the pace of this time is slower), the pace comparator/calculation unit 103 calculates a difference (NP−BP) between NP and BP as a pace difference CP (step S708), attaches a plus sign to the calculated pace difference CP to display it as "+CP" on the display unit 104 (step S709).

On the other hand, when the latest pace (NP) is not greater than the pace (BP) recorded in the previous time (when the pace of this time is faster or is the same) at step S705, the pace comparator/calculation unit 103 calculates a difference (BP−NP) between BP and NP as a pace difference CP (step S706), attaches a minus sign to the calculated pace difference CP to display it as "−CP" on the display unit 104 (step S707).

Thus, the user is allowed to easily know the results of comparison between the latest pace and the pace recorded in the previous time every time when he moves the predetermined distance.

Figure 8:
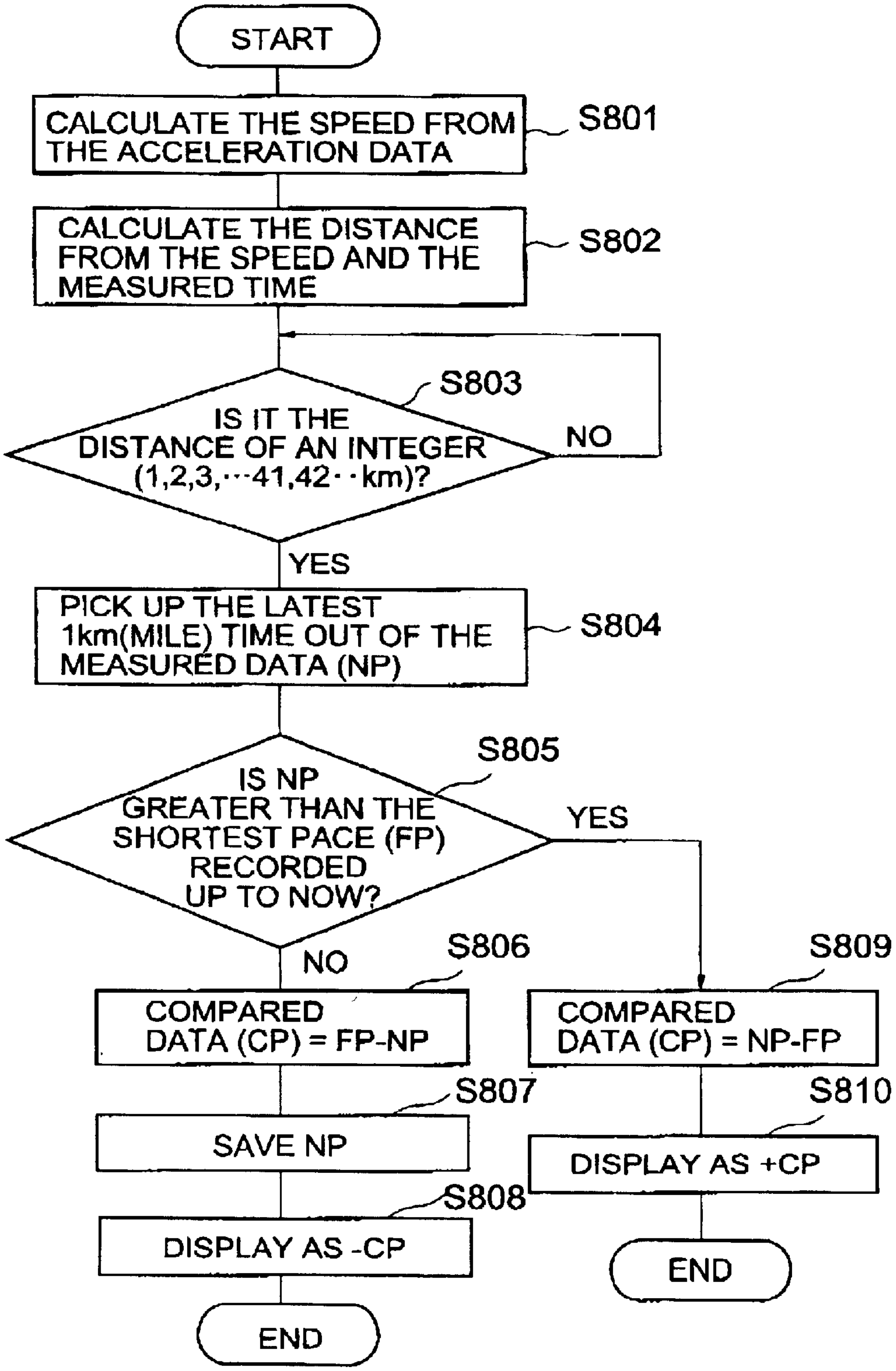
FIG. 8 is a flowchart illustrating the processing by the pace measuring device according to the embodiment of the invention.

FIG. 8 is a flowchart illustrating the processing by the pace measuring device according to the embodiment of the invention, i.e., the processing for comparing the latest pace now being measured with the shortest pace recorded in the past. Described below is the processing for comparing the latest pace with the shortest pace.

A person mounting the pace measuring device operates the switch input unit 101 as he starts marathon running to start measuring. The chronograph measuring unit 107 starts measuring the time in response to the start operation.

The acceleration sensor 108 detects the acceleration data of the person mounting the pace measuring device, and outputs it to the chronograph control unit 102.

The chronograph control unit 102 calculates the moving speed of the user based on the acceleration data from the acceleration sensor 108 (step S801).

Next, the chronograph control unit 102 calculates the moving distance from the start position of the user based on the time measured by the chronograph measuring unit 107 and on the moving speed data (step 5802).

Then, the chronograph control unit 102 judges whether the calculated moving distance is a predetermined distance (distance of an integer in this embodiment)(step S803).

When it is judged that the calculated moving distance has become equal to the predetermined distance, the chronograph control unit 102 picks up, from the storage unit 109, the latest moving time (latest pace (NP)) over the reference distance (e.g., one kilometer or one mile) out of the measured data (step S804).

The pace comparator/calculation unit 103 reads the shortest pace (FP) data stored in the storage unit 109 and recorded in the past, and compares it with the latest pace (NP) recorded this time (step S805).

When the latest pace (NP) is greater than the shortest pace (FP) (when the pace of this time is slower), the pace comparator/calculation unit 103 calculates a difference (NP−FP) between NP and FP as a pace difference CP (step S809), attaches a plus sign to the calculated pace difference CP to display it as "+CP" on the display unit 104 (step S810).

On the other hand, when the latest pace (NP) is not greater than the shortest pace (FP) (when the pace of this time is faster or is the same) at step 805, the pace comparator/calculation unit 103 calculates a difference (FP−NP) between FP and NP as a pace difference CP (step S806), and stores the data of the latest pace as the shortest pace in the storage unit 109 (stepS807). The pace comparator/calculation unit 103 further attaches a minus sign to the calculated pace difference CP to display it as "−CP" on the display unit 104 (step S808).

Thus, the user is allowed to easily know the results of comparison between the latest pace and the shortest pace recorded in the past every time when he moves the predetermined distance.

Figure 9:
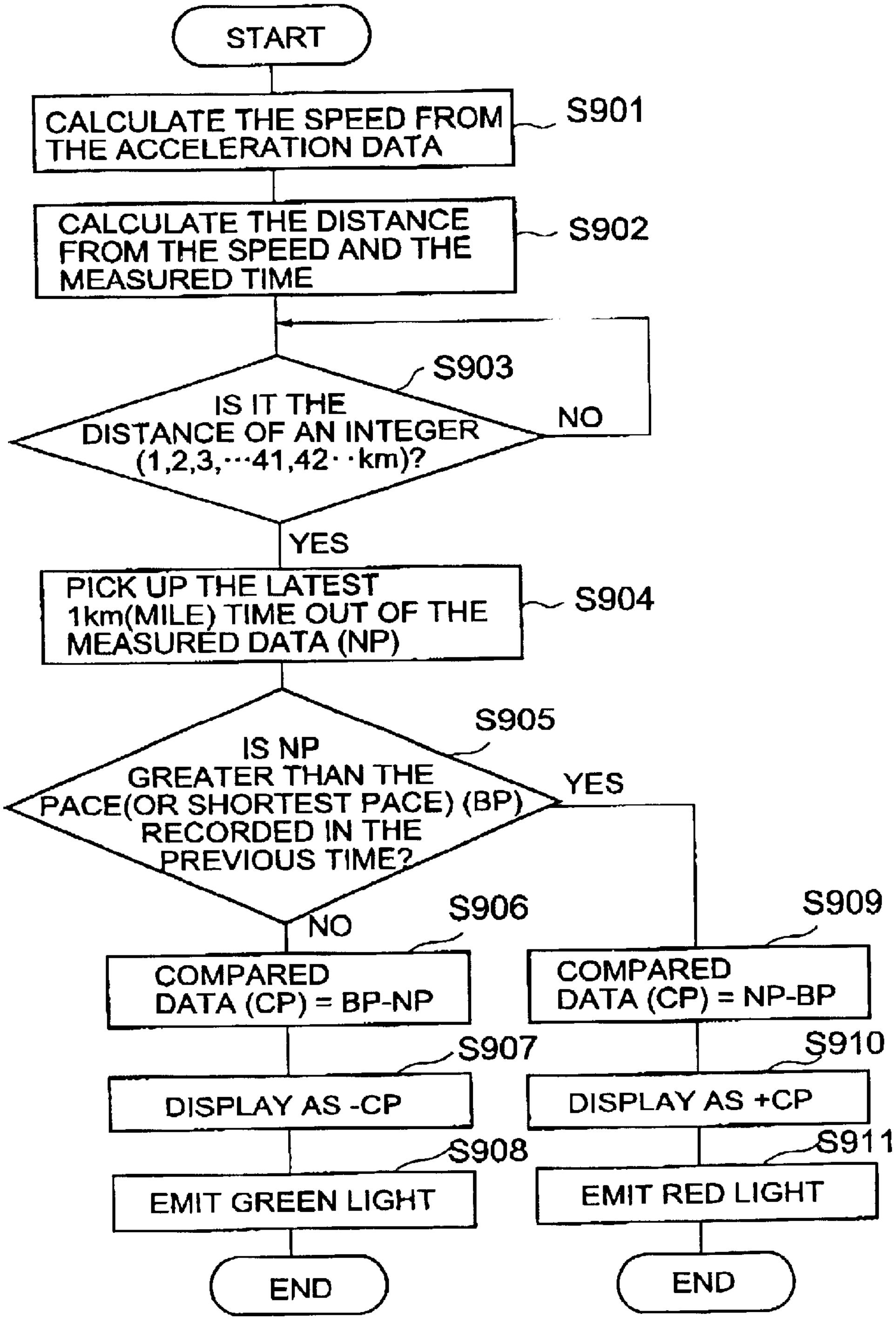
FIG. 9 is a flowchart illustrating the processing by the pace measuring device according to the embodiment of the invention.

FIG. 9 is a flowchart illustrating the processing by the pace measuring device according to the embodiment of the invention, i.e., the processing for comparing the pace now being measured with the pace recorded in the previous time (or the shortest pace in the past). Described below is the processing for comparing the latest pace being measured with the recorded pace (or the shortest pace).

A person mounting the pace measuring device operates the switch input unit 101 as he starts marathon running to start measuring. The chronograph measuring unit 107 starts measuring the time in response to the start operation.

The acceleration sensor 108 detects the acceleration data of the person mounting the pace measuring device, and outputs it to the chronograph control unit 102.

The chronograph control unit 102 calculates the moving speed of the user based on the acceleration data from the acceleration sensor 108 (step S901).

Next, the chronograph control unit 102 calculates the moving distance from the start position of the user based on the time measured by the chronograph measuring unit 107 and on the moving speed data (step S902).

Then, the chronograph control unit 102 judges whether the calculated moving distance is a predetermined distance (distance of an integer in this embodiment)(step S903).

When it is judged that the calculated moving distance has become equal to the predetermined distance, the chronograph control unit 102 picks up, from the storage unit 109, the latest moving time (latest pace (NP)) over the reference distance (e.g., one kilometer or one mile) out of the measured data (step S904).

The pace comparator/calculation unit 103 reads the pace (BP) data recorded in the running of the previous time (or the past shortest pace stored in the storage unit 109) from the storage unit 109, and compares it with the latest pace (NP) recorded this time (step S905).

When the latest pace (NP) is greater than the pace (BP) recorded in the previous time (or the shortest pace) (when the pace of this time is slower), the pace comparator/calculation unit 103 calculates a difference (NP−BP) between NP and BP as a pace difference CP (step S909). The pace comparator/calculation unit 103 attaches a plus sign to the calculated pace difference CP to display it as "+CP" on the display unit 104 (step S910), and energizes the light-emitting unit 106 to emit red light (step S911).

On the other hand, when the latest pace (NP) is not greater than the pace (or the shortest pace) (BP) recorded in the previous time (when the pace of this time is faster or is the same) at step 905, the pace comparator/calculation unit 103 calculates a difference (BP−NP) between BP and NP as a pace difference CP (step S906). The pace comparator/calculation unit 103 attaches a minus sign to the calculated pace difference CP to display it as "−CP" on the display unit 104 (step S907) and energizes the light-emitting unit 106 to emit green light (step S908).

Thus, the user is allowed to easily know the results of comparison between the latest pace and the pace recorded in the previous time (or the shortest pace in the past) every time when he moves the predetermined distance. In particular, the user is informed of the result of comparison of paces by light emitted from the light-emitting unit 106, and is allowed to confirm a difference in the pace by looking at the display unit 104 at an appropriate moment.

Figure 10:
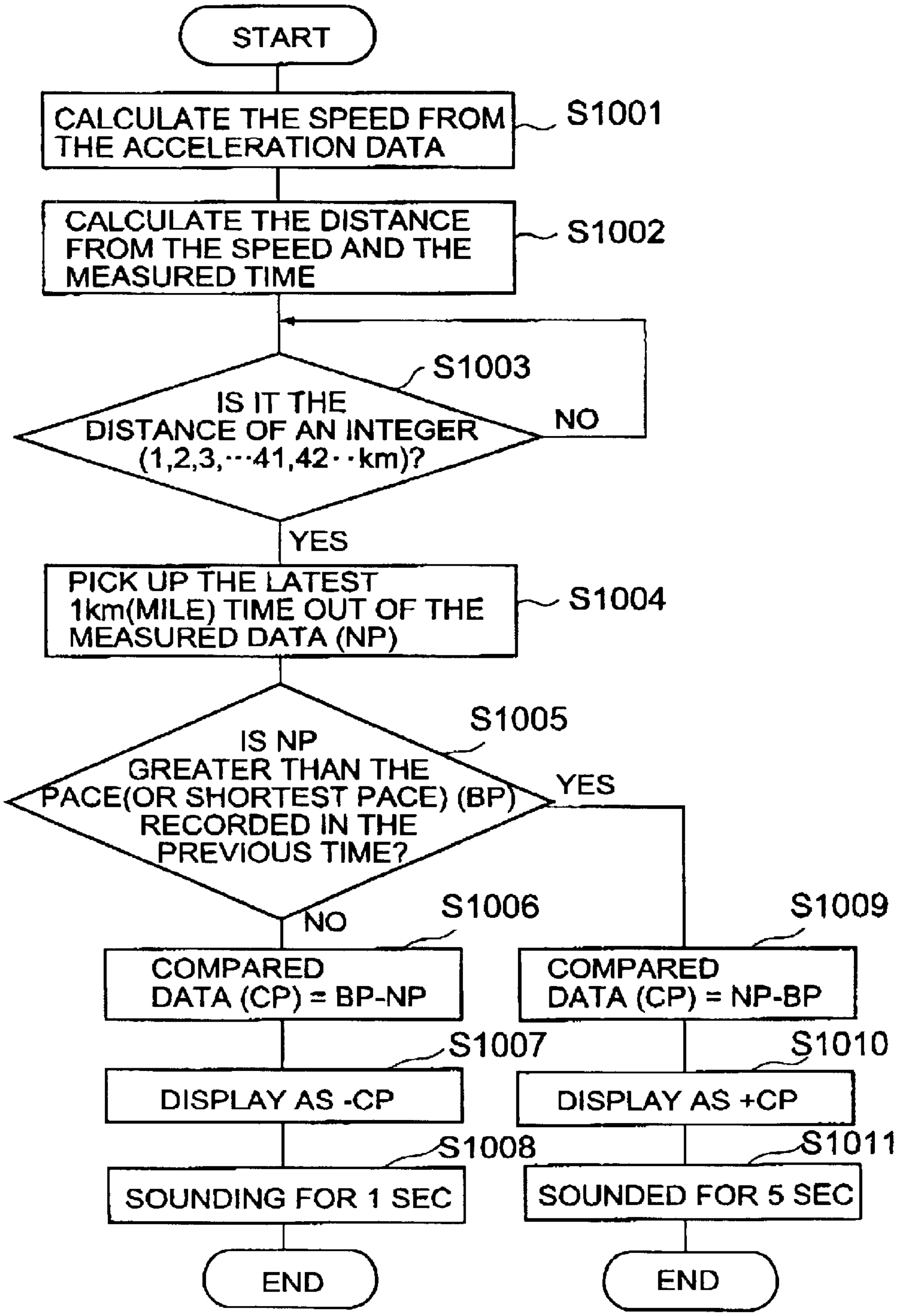
FIG. 10 is a flowchart illustrating the processing by the pace measuring device according to the embodiment of the invention.

FIG. 10 is a flowchart illustrating the processing by the pace measuring device according to the embodiment of the invention, i.e., the processing for comparing the pace now being measured with the pace recorded in the previous time (or the shortest pace in the past). Described below is the processing for comparing the pace being measured with the recorded pace (or the shortest pace).

A person mounting the pace measuring device operates the switch input unit 101 as he starts marathon running to start measuring. The chronograph measuring unit 107 starts measuring the time in response to the start operation.

The acceleration sensor 108 detects the acceleration data of the person mounting the pace measuring device, and outputs it to the chronograph control unit 102.

The chronograph control unit 102 calculates the moving speed of the user based on the acceleration data from the acceleration sensor 108 (step S1001).

Next, the chronograph control unit 102 calculates the moving distance from the start position of the user based on the time measured by the chronograph measuring unit 107 and on the moving speed data (step S1002).

Then, the chronograph control unit 102 judges whether the calculated moving distance is a predetermined distance (distance of an integer in this embodiment)(step S1003).

When it is judged that the calculated moving distance has become equal to the predetermined distance (distance of an integer in this embodiment), the chronograph control unit 102 picks up, from the storage unit 109, the latest moving time (latest pace (NP)) over the reference distance (e.g., one kilometer or one mile) out of the measured data (step S1004).

The pace comparator/calculation unit 103 reads the pace (BP) data recorded in the running of the previous time (or the past shortest pace stored in the storage unit 109) from the storage unit 109, and compares it with the latest pace (NP) recorded this time (step S1005).

When the latest pace (NP) is greater than the pace (BP) recorded in the previous time (or the shortest pace) (when the pace of this time is slower), the pace comparator/calculation unit 103 calculates a difference (NP−BP) between NP and BP as a pace difference CP (step S1009). The pace comparator/calculation unit 103 attaches a plus sign to the calculated pace difference CP to display it as "+CP" on the display unit 104 (step S1010), and energizes the sounding unit 105 to notify by producing sound for 5 seconds (step S1011).

On the other hand, when the latest pace (NP) is not greater than the pace (or the shortest pace) (BP) recorded in the previous time (when the pace of this time is faster or is the same) at step 1005, the pace comparator/calculation unit 103 calculates a difference (BP−NP) between BP and NP as a pace difference CP (step S1006). The pace comparator/calculation unit 103 attaches a minus sign to the calculated pace difference CP to display it as "−CP" on the display unit 104 (step S1007) and energizes the sounding unit 105 to notify by producing sound for 1 second (step S1008).

Thus, the user is allowed to easily know the results of comparison between the latest pace and the pace recorded in the previous time (or the shortest pace in the past) every time when he moves the predetermined distance. In particular, the user is informed of the result of comparison of paces by sound produced from the sounding unit 105, and is allowed to confirm a difference in the pace by looking at the display unit 104 at an appropriate moment.

In this diagram, the duration for producing the sound is differed depending upon a difference between the pace of the previous time and the pace of this time. It is, however, also allowable to change the tone instead of changing the duration of sounding. For example, when the pace is faster than, or is the same as, the pace of the previous time, the sound of a high frequency may be produced and, in other cases, the sound of a low frequency may be produced.

Figure 11:
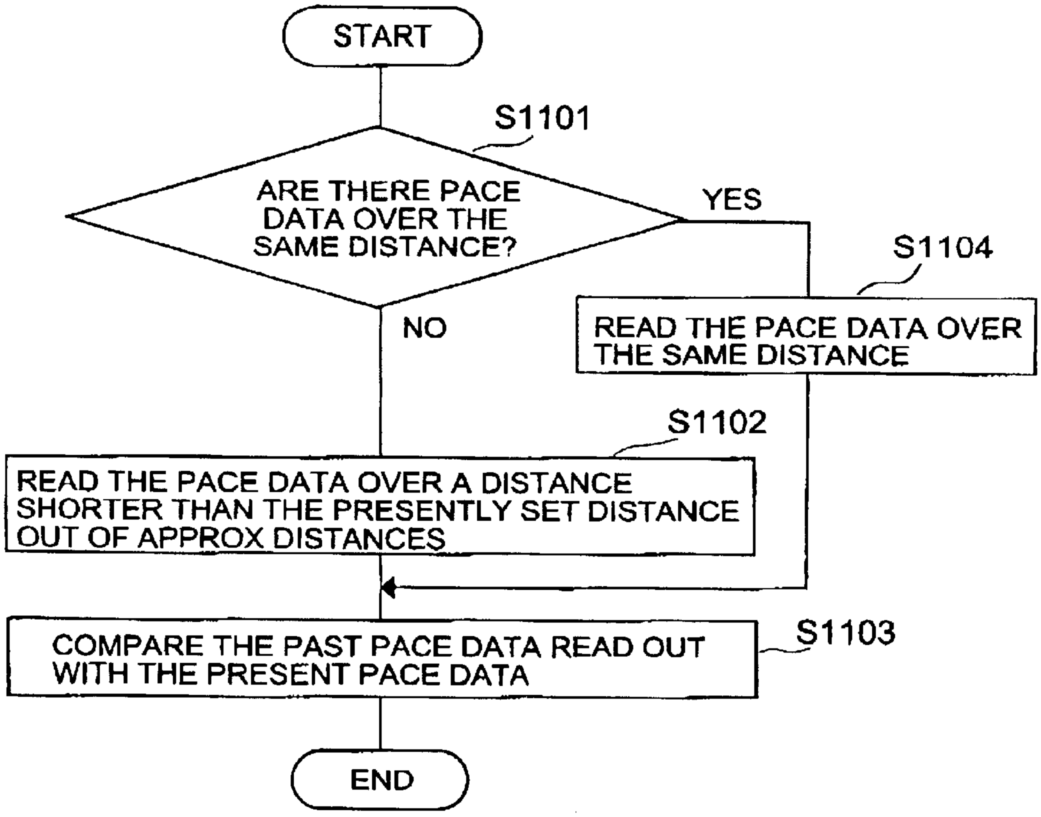
FIG. 11 is a flowchart illustrating the processing by the pace measuring device according to the embodiment of the invention.

FIG. 11 is a flowchart illustrating the processing by the pace measuring device according to the embodiment of the invention, i.e., the processing for comparing the pace measured this time with the pace over an approximate distance in the past pace data. Described below is the processing for comparing the paces over approximate distances.

A person mounting the pace measuring device operates the switch input unit 101 as he starts marathon running to start measuring. The chronograph measuring unit 107 starts measuring the time in response to the start operation. When the user executes the ending operation by operating the switch input unit 101 as he has completed the running over the predetermined distance, the chronograph measuring unit 107 ends the measuring of time in response to the ending operation. At the same time, the chronograph control unit 102 divides the time measured by the chronograph measuring unit 107 by the running distance (preset distance) stored in advance in the storage unit 109 to calculate the present pace (latest pace (NP)) after having completed the movement.

The chronograph control unit 102 judges whether there are pace data over the same distance as the distance moved this time in the pace data stored in the storage unit 109 (step S1101).

When the chronograph control unit 102 has judged that there exist the pace data over the same distance as the distance run this time, the pace comparator/calculation unit 103 reads the pace data of the same distance from the storage unit 109 (step S1104), and compares the past pace data that are read out with the pace data of this time (step S1103).

When it is judged by the chronograph control unit 102 at step S1101 that there is no pace data over the same distance as the distance run this time, the pace comparator unit 103 reads, from the storage unit 109, the pace data of a distance shorter than the distance of this time out of the moving distances (approximate distances) within a predetermined approximate range stored in the storage unit 109 (step S1102), and compares the past pace data that are read out with the pace data of this time (step S1103).

Thereafter, the processing shown in FIG. 2 or 3 is executed to confirm a difference between the past pace and the pace of this time over the same distance. This makes it possible to learn the results of comparison of paces compared under a condition where the moving distances are nearly the same.

Figure 12:
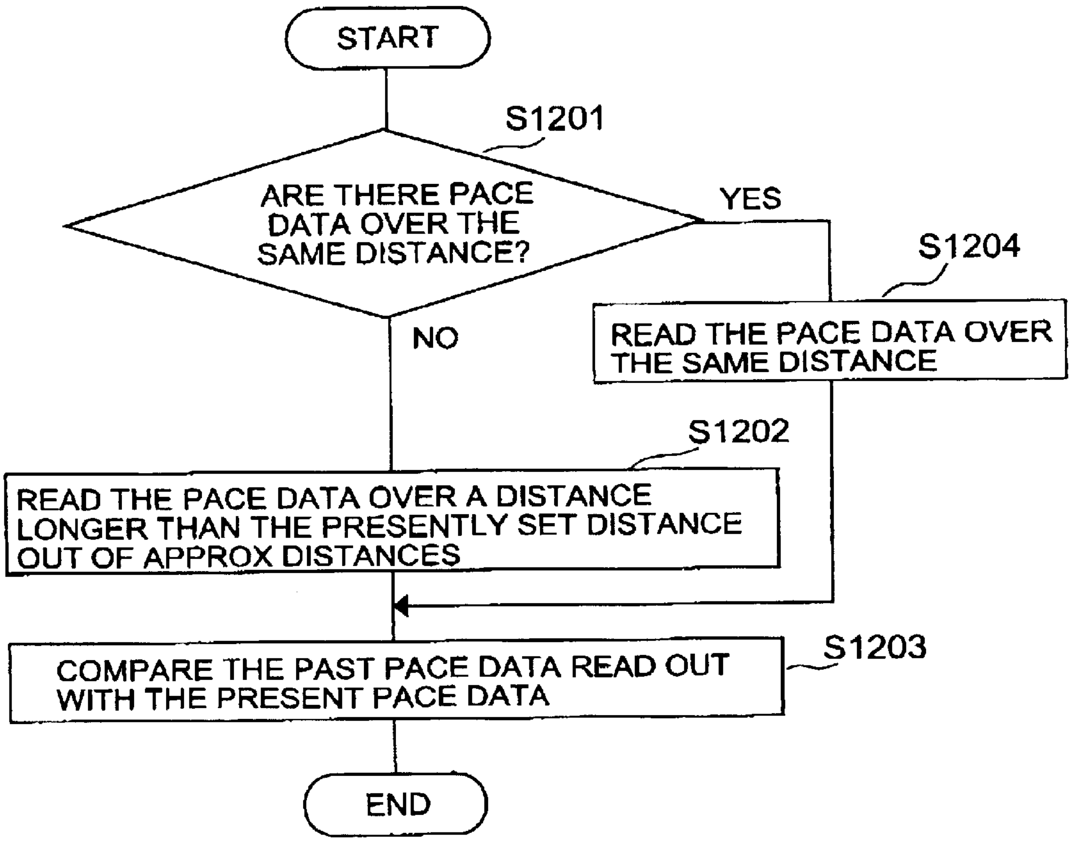
FIG. 12 is a flowchart illustrating the processing by the pace measuring device according to the embodiment of the invention.

FIG. 12 is a flowchart illustrating the processing by the pace measuring device according to the embodiment of the invention, i.e., the processing for comparing the pace measured this time with the pace over an approximate distance in the past pace data. Described below is the processing for comparing the paces over approximate distances.

A person mounting the pace measuring device operates the switch input unit 101 as he starts marathon running to start measuring. The chronograph measuring unit 107 starts measuring the time in response to the start operation. When the user executes the ending operation by operating the switch input unit 101 as he has completed the running over the predetermined distance, the chronograph measuring unit 107 ends the measuring of time in response to the ending operation. At the same time, the chronograph control unit 102 divides the time measured by the chronograph measuring unit 107 by the running distance (preset distance) stored in advance in the storage unit 109 to calculate the present pace (latest pace (NP)) after having completed the movement.

The chronograph control unit 102 judges whether there are pace data over the same distance as the distance moved this time in the paced at a stored in the storage unit 109 (step S1201).

When the chronograph control unit 102 has judged that there exist the pace data over the same distance as the distance run this time, the pace comparator/calculation unit 103 reads the pace data of the same distance from the storage unit 109 (step S1204), and compares the past pace data that are read out with the pace data of this time (step S1203).

When it is judged by the chronograph control unit 102 at step S1201 that there is no pace data over the same distance as the distance run this time, the pace comparator unit 103 reads, from the storage unit 109, the pace data of a distance longer than the distance of this time out of the moving distances (approximate distances) within a predetermined approximate range stored in the storage unit 109 (step S1202), and compares the past pace data that are read out with the pace data of this time (step S1203).

Thereafter, the processing shown in FIG. 2 or 3 is executed to confirm a difference between the past pace and the pace of this time over the same distance. This makes it possible to learn the results of comparison of paces compared under a condition where the moving distances are nearly the same.

Figure 13:
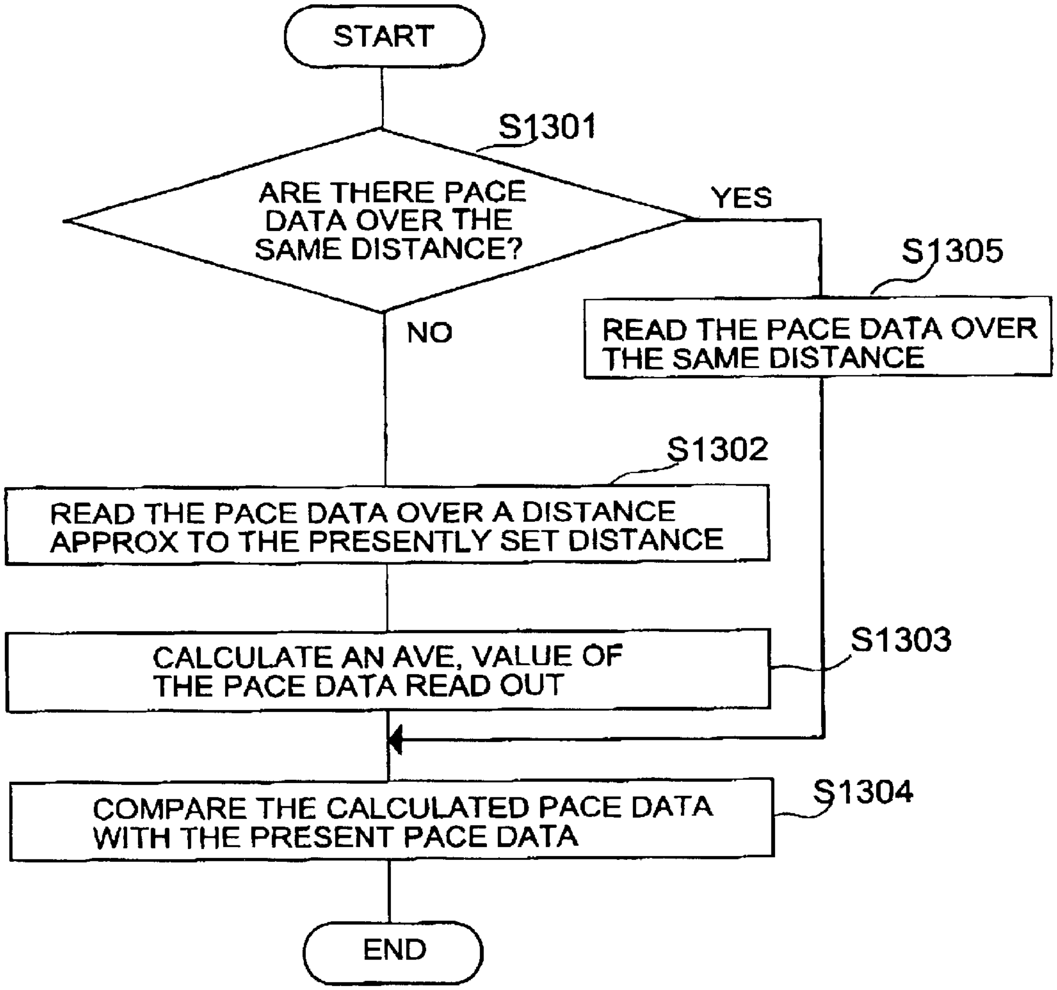
FIG. 13 is a flowchart illustrating the processing by the pace measuring device according to the embodiment of the invention.

FIG. 13 is a flowchart illustrating the processing by the pace measuring device according to the embodiment of the invention, i.e., the processing for comparing the pace measured this time with the pace over an approximate distance in the past pace data. Described below is the processing for comparing the paces over approximate distances.

A person mounting the pace measuring device operates the switch input unit 101 as he starts marathon running to start measuring. The chronograph measuring unit 107 starts measuring the time in response to the start operation. When the user executes the ending operation by operating the switch input unit 101 as he has completed the running over the predetermined distance, the chronograph measuring unit 107 ends the measuring of time in response to the ending operation. At the same time, the chronograph control unit 102 divides the time measured by the chronograph measuring unit 107 by the running distance (preset distance) stored in advance in the storage unit 109 to calculate the pace (latest pace (NP)) just after having completed the running.

The chronograph control unit 102 judges whether there is pace data over the same distance as the distance run this time in the pace data stored in the storage unit 109 (stepS1301).

When the chronograph control unit 102 has judged that there exists the pace data over the same distance as the distance run this time, the pace comparator/calculation unit 103 reads the pace data over the same distance from the storage unit 109 (step S1305), and compares the past pace data that are read out with the pace data of this time (step S1304).

When it is judged by the chronograph control unit 102 at step S1301 that there is no pace data over the same distance as the distance run this time, the pace comparator unit 103 reads, from the storage unit 109, a plurality of pace data of moving distances (approximate distances) within a predetermined approximate range stored in the storage unit 109 (step S1302), and calculates an average value of the plurality of pace data that are read out (step S1303).

The pace comparator/calculation unit 103 compares the average data of the above paces with the pace data of this time (step S1304).

Thereafter, the processing shown in FIG. 2 or 3 is executed to confirm a difference between the past pace and the pace of this time over the same distance. This makes it possible to learn the results of comparison of the pace of this time with the average pace data over the moving distance which is approximate to the moving distance of this time.

Figure 14:
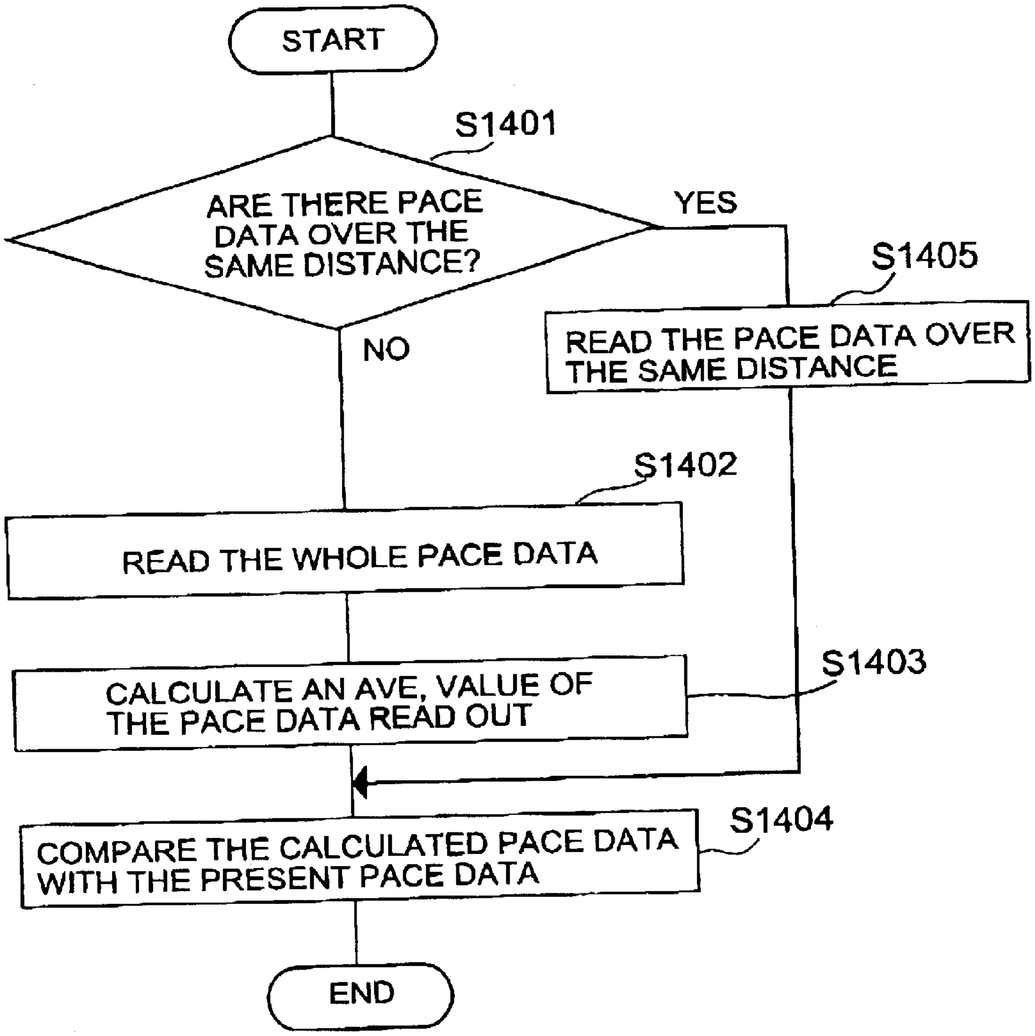
FIG. 14 is a flowchart illustrating the processing by the pace measuring device according to the embodiment of the invention.

FIG. 14 is a flowchart illustrating the processing by the pace measuring device according to the embodiment of the invention, i.e., the processing for comparing the pace measured this time with the pace over an approximate distance in the past pace data. Described below is the processing for comparing the paces over approximate distances.

A person mounting the pace measuring device operates the switch input unit 101 as he starts marathon running to start measuring. The chronograph measuring unit 107 starts measuring the time in response to the start operation. When the user executes the ending operation by operating the switch input unit 101 as he has completed the running over the predetermined distance, the chronograph measuring unit 107 ends the measuring of time in response to the ending operation. At the same time, the chronograph control unit 102 divides the time measured by the chronograph measuring unit 107 by the running distance (preset distance) stored in advance in the storage unit 109 to calculate the pace (latest pace (NP)) just after having completed the running.

The chronograph control unit 102 judges whether there are pace data over the same distance as the distance run this time in the pace data stored in the storage unit 109 (step S1401).

When the chronograph control unit 102 has judged that there exist the pace data over the same distance as the distance run this time, the pace comparator/calculation unit 103 reads the pace data over the same distance from the storage unit 109 (step S1405), and compares the past pace data that are read out with the pace data of this time (step S1404).

When it is judged by the chronograph control unit 102 at step S1401 that there is no pace data over the same distance as the distance run this time, on the other hand, the pace comparator unit 103 reads, from the storage unit 109, the whole pace data stored in the storage unit 109 (step S1402), and calculates an average value of the pace data that are read out (step S1403).

The pace comparator/calculation unit 103 compares the average value of the pace data with the pace data of this time (step S1404).

Thereafter, the processing shown in FIG. 2 or 3 is executed to confirm a difference between the past pace and the pace of this time over the same distance. This makes it possible to learn the results of comparison of the average value of the whole pace data recorded in the past with the pace of this time.

In this embodiment, the pace data are calculated after the completion of running, and are compared with the pace data recorded after the completion of the running of the previous time. Namely, the pace data after the completion of running are compared with each other. However, it is also allowable to compare the pace data during the running with the pace data after the completion of running of the previous time. Namely, it is allowable to calculate the pace over a predetermined unit distance during the running, and to compare the pace data with the pace data that have been recorded after the completion of running in the previous time.

It is further allowable to compare the pace data obtained during the running with each other. Namely, the pace is calculated during the running every after having run a predetermined unit distance, and the latest pace data over the predetermined unit distance are compared with the pace data over the above predetermined unit distance.

As described above, the pace measuring device according to the embodiment is provided with means for comparing the pace of this time with the past paces, making it possible to easily know the results of comparison of paces.

The pace measuring device of the invention further makes it possible to easily recognize the results of comparison of paces even during the measuring while moving.

The pace measuring device of the invention enables the user to easily learn the result of comparison of the paces, as well as to easily learn the result of comparison of the paces during the measuring while moving.

What is claimed is:

1. A pace measuring device comprising:

pace measuring means for measuring a user's pace, which is a moving time of the user per a unit distance, the pace measuring means including moving distance measuring means for measuring a moving distance of the user;

storage means for storing a plurality of pace values;

comparator means for comparing a pace value stored in the storage means with a current pace value measured by the pace measuring means;

notifying means for notifying of the result of comparison by the comparator means; and selection means for selecting a predetermined pace value from the plurality of stored pace values to be compared with the current pace value by the comparator means;

wherein the comparator means includes distance reach judging means for judging whether the moving distance measured by the moving distance measuring means has reached a reference distance stored in advance in the storage means, and compares the current pace value with the fastest pace value stored in the storage means when the distance reach judging means has judged that the moving distance is in agreement with the reference distance, and the notifying means notifies of the result of the comparison performed by the comparator means.

2. A pace measuring device according to claim 1; wherein the notifying means includes a sound-emitting unit for notifying that the current pace value is either faster or slower than the selected pace value based on a result of the comparison performed by the comparator means.

3. A pace measuring device according to claim 1; wherein the notifying means includes a light-emitting unit for notifying that the current pace value is either faster or slower than the selected pace value based on a result of the comparison performed by the comparator means.

4. A pace measuring device according to claim 1; wherein the pace measuring device is accommodated within an electronic wrist watch.

5. A pace measuring device:

pace measuring means for measuring a user's pace, which is a moving time of the user per a unit distance, the pace measuring means including moving distance measuring means for measuring a moving distance of the user;

storage means for storing a plurality of pace values;

comparator means for comparing a pace value stored in the storage means with a current pace value measured by the pace measuring means;

notifying means for notifying of the result of comparison by the comparator means; and selection means for selecting a predetermined pace value from the plurality of stored pace values to be compared with the current pace value by the comparator means;

wherein the comparator means includes distance reach judging mean for judging whether the moving distance measured by the moving distance measuring means has reached a reference distance stored in advance in the storage means, and compares the current pace value with the fastest pace value stored in the storage means when the distance reach judging means has judged that the moving distance is in agreement with the reference distance, and the notifying means notifies of the result of the comparison performed by the comparator means.

6. A pace measuring device according to claim 5; wherein the notifying means includes a sound-emitting unit for notifying that the current pace value is either faster or slower than the selected pace value based on a result of the comparison performed by the comparator means.

7. A pace measuring device according to claim 5; wherein the notifying means includes a light-emitting unit for notifying that the current pace value is either faster or slower than the selected pace value based on a result of the comparison performed by the comparator means.

8. A pace measuring device comprising:

pace measuring means for measuring a user's pace, which is a moving time of the user per aunit distance;

storage means for storing a plurality of pace values;

comparator means for comparing a pace value stored in the storage means with a current pace value measured by the pace measuring means;

notifying means for notifying of the result of comparison by the comparator means;

selection means for selecting a predetermined pace value from the plurality of stored pace values to be compared with the current pace value by the comparator means; and first time measuring means for measuring a first moving time and for measuring a second moving time from an initial state in response to a reset signal;

wherein the comparator means produces a coincidence signal as well as the reset signal when the time measured by the first time measuring means is in agreement with the fastest pace value stored in the storage means, and the notifying means emits at least one of a sound and a light for notifying that the moving time is in agreement with the fastest pace value in response to the coincidence signal.

9. A pace measuring device according to claim 8; wherein the pace measuring includes acceleration measuring means for measuring the acceleration at which the user is moving, second time measuring means for measuring the user's moving time, moving distance calculating means for calculating the user's moving distance based upon the acceleration measured by the acceleration measuring means, and pace calculating means for calculating the user's pace by dividing the time measured by the time measuring means by the user's moving distance.

10. A pace measuring device according to claim 8; wherein the pace measuring device is accommodated within an electronic wrist watch.

11. A pace measuring device comprising:

pace measuring means for measuring a user's pace, which is a moving time of the user per a unit distance;

storage means for storing a plurality of pace values;

comparator means for comparing a pace value stored in the storage means with a current pace value measured by the pace measuring means;

notifying means for notifying of the result of comparison by the comparator means;

selection means for selecting a predetermined pace value from the plurality of stored pace values to be compared with the current pace value by the comparator means; and first time measuring means for measuring a first moving time and for measuring a second moving time from an initial state in response to a reset signal;

wherein the comparator means produces a coincidence signal as well as the reset signal when the time measured by the first time measuring means is in agreement with the fastest pace value stored in the storage means, and the notifying means emits at least one of a sound and a light for notifying that the moving time is in agreement with the fastest pace value in response to the coincident signal.

12. A pace measuring device according to claim 11; wherein the pace measuring includes acceleration measuring means for measuring the acceleration at which the user is moving, second time measuring means for measuring the user's moving time, moving distance calculating means for calculating the user's moving distance based upon the acceleration measured by the acceleration measuring means, and pace calculating means for calculating the user's pace by dividing the time measured by the time measuring means by the user's moving distance.

13. A pace measuring device according to claim 11; wherein the pace measuring device is accommodated within an electronic wrist watch.

* * * * *